US011869735B2

(12) United States Patent
Del Giudice et al.

(10) Patent No.: US 11,869,735 B2
(45) Date of Patent: Jan. 9, 2024

(54) CONTACTOR

(71) Applicant: Solid State PLC, Redditch (GB)

(72) Inventors: Mark Stephen Del Giudice, Nutley (GB); John Hamilton Merrill, Burgess Hill (GB)

(73) Assignee: Solid State PLC, Redditch (GB)

( * ) Notice: Subject to any disclaimer, the term of this patent is extended or adjusted under 35 U.S.C. 154(b) by 50 days.

(21) Appl. No.: 17/265,116

(22) PCT Filed: Aug. 1, 2019

(86) PCT No.: PCT/GB2019/052157
§ 371 (c)(1),
(2) Date: Feb. 1, 2021

(87) PCT Pub. No.: WO2020/025958
PCT Pub. Date: Feb. 6, 2020

(65) Prior Publication Data

US 2021/0313132 A1 Oct. 7, 2021

(30) Foreign Application Priority Data

Aug. 2, 2018 (GB) ...................................... 1812605

(51) Int. Cl.
*H01H 50/54* (2006.01)
*H01H 50/02* (2006.01)
(Continued)

(52) U.S. Cl.
CPC ............ *H01H 50/54* (2013.01); *H01H 50/02* (2013.01); *H01H 50/12* (2013.01); *H01H 50/44* (2013.01)

(58) Field of Classification Search
CPC ............................... H01H 50/54; H01H 50/44
(Continued)

(56) References Cited

U.S. PATENT DOCUMENTS 3,240,909 A * 3/1966 Pflanz ....................... H01H 9/16 200/317
3,533,025 A * 10/1970 Emmons ................ H01H 51/28 335/151
(Continued)

FOREIGN PATENT DOCUMENTS

CN 2342458 Y 10/1999
CN 106229221 A 12/2016
(Continued)

OTHER PUBLICATIONS

International Search Report and Written Opinion on PCT/GB2019/052157, dated Feb. 19, 2020 (17 pages).
(Continued)

*Primary Examiner* — Alexander Talpalatski
(74) *Attorney, Agent, or Firm* — Foley & Lardner LLP

(57) ABSTRACT

A contactor (1) comprising a first contact member (3) fixed and connected to a first conductor (5) of an electrical circuit; a second contact member (7) connected to a second conductor (9) of the electrical circuit by a connector (11); wherein the second contact member moves between a break position, in which the first and second contact members are out of contact, and a make position, in which the first and second contact members are in contact; an actuator assembly (15) coupled to the second contact member such that actuation of the actuator assembly translates into movement of the second contact member; an electromagnetic arrangement comprising an electromagnetic coil (17) and at least a part of the actuator assembly, wherein, when the coil is energised, the coil generates a magnetic field and thereby the actuation assembly is caused to move under the influence of the magnetic field, which in turn causes the second contact member to move; a hermetically sealable enclosure (2); wherein the first and second contact members, the connector,
(Continued)

Figure 2:
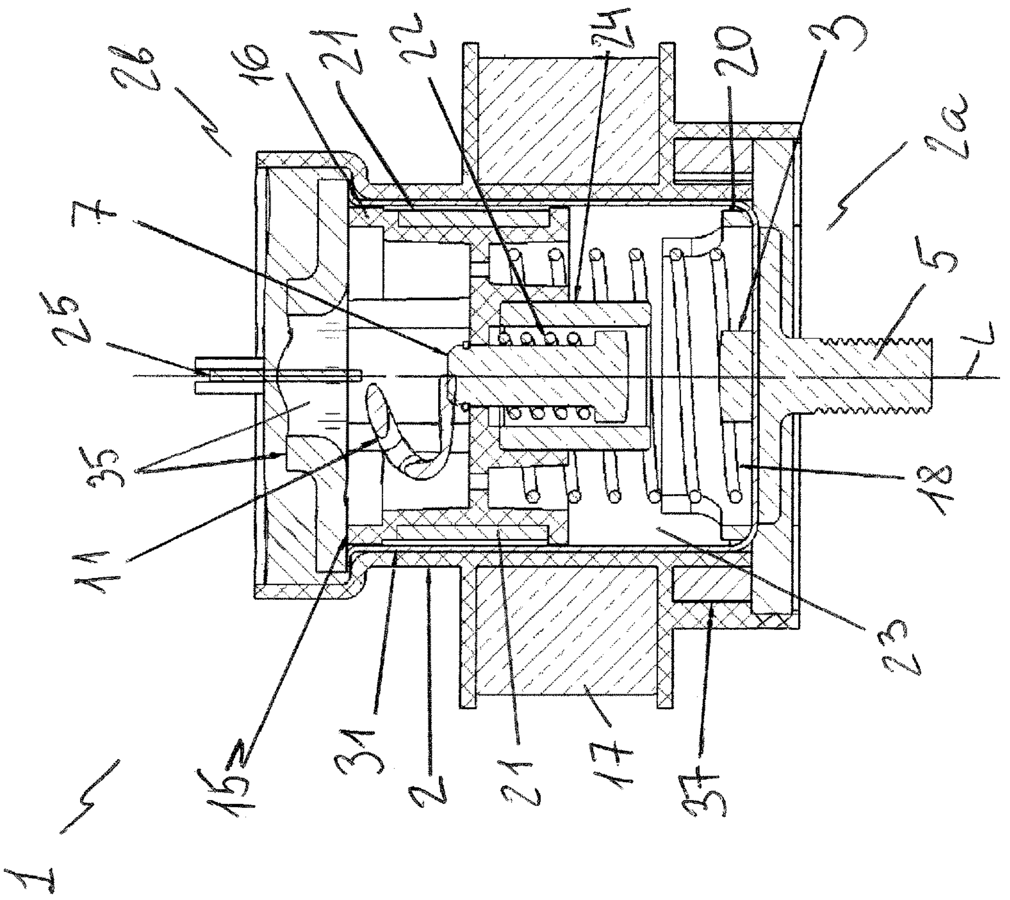

and the actuation assembly are inside the enclosure; and the coil is outside the enclosure.

20 Claims, 1 Drawing Sheet

(51) Int. Cl.
*H01H 50/12* (2006.01)
*H01H 50/44* (2006.01)

(58) Field of Classification Search
USPC .......................................................... 335/151
See application file for complete search history.

(56) References Cited

U.S. PATENT DOCUMENTS

| | | | | |
|---|---|---|---|---|
| 3,813,622 | A * | 5/1974 | Remington | H01H 51/288 335/151 |
| 5,903,203 | A | 5/1999 | Elenbaas | |
| 5,936,535 | A * | 8/1999 | Rosen | H01H 71/465 340/638 |
| 7,119,643 | B2 * | 10/2006 | Iwasaki | H01H 51/281 335/154 |
| 8,686,815 | B2 * | 4/2014 | Sohn | H01H 71/46 335/17 |
| 2015/0022292 | A1 | 1/2015 | Tachikawa et al. | |
| 2018/0166244 | A1 | 6/2018 | Kobayashi et al. | |

FOREIGN PATENT DOCUMENTS

| | | | |
|---|---|---|---|
| DE | 1116816 | B | 11/1961 |
| DE | 1564937 | A1 | 3/1970 |
| GB | 1435005 | A | 5/1976 |
| JP | 62-274520 | A | 11/1987 |
| JP | H468334 | U | 6/1992 |
| JP | 2013-232340 | A | 11/2013 |
| JP | 2017-016907 | A | 1/2017 |
| JP | 2017-506813 | A | 3/2017 |

OTHER PUBLICATIONS

Search Report on GB1812605.2 dated Oct. 1, 2018 (3 pages).
Japanese Office Action on Japanese Patent Application No. 2021 505902, dated Aug. 1, 2023 (18 pages, including English translation).

* cited by examiner

CONTACTOR

CROSS-REFERENCE TO RELATED APPLICATIONS

This application is a U.S. National Stage Application under 35 U.S.C. 371 of International Patent Application No. PCT/GB2019/052157, filed on Aug. 1, 2019, which claims priority to United Kingdom Patent Application No. GB 1812605.2, filed on Aug. 2, 2018, the content of each of which is incorporated herein by reference in their entireties

FIELD OF THE INVENTION

The present invention relates to an electromagnetic contactor to make and break an electric circuit.

BACKGROUND TO THE INVENTION

Electromagnetic contactors are used in a variety of applications, including, but not limited thereto, electric vehicles, for making and breaking electric circuits. A typical electromagnetic contactor as described, for example, in WO 2008/033349 or KR 20160031897 A, has a casing which hermetically houses an actuator moveable between contact and tripped positions and a pair of stationary electrodes. Typically, the electrodes are positioned next to each other within the casing and the actuator has a cross bar which in the contact position connects the two stationary electrodes to make the circuit. A spring normally keeps the actuator in the tripped position. The contactor houses an electromagnetic coil, which, when energised, causes the actuator to overcome and deform the spring and move into the contact position. The actuator remains in the contact position for as long as the coil is remains energised. Sometimes a magnetic latch mechanism is provided to help the actuator to remain in the contact position and to reduce the energy consumed by the coil. To break the circuit, the coil is de-energised thereby releasing the spring, which moves the actuator into the tripped position. The problem with such an arrangement is that the electrodes can become misaligned, for example, through wear over time or due to stress, thus preventing the cross bar from properly contacting the electrodes and also allowing arcing to occur. Furthermore, the forcing of the cross bar into the contact position with the two electrodes can cause stresses and compromise the hermetic seal in the casing. U.S. Pat. No. 2,278,971 discloses an alternative arrangement in which the actuator has an axially movable rod instead of a cross bar for connecting the stationary electrodes located on the same side of the casing. The axially movable rod is movable into and out of contact with a first electrode and is permanently connected to a second electrode by a conductive spring and a fixed bracket-like conductor. The electrical path is established between the two electrodes when the rod is moved axially into contact with the first electrode. This, coupled with the fact that the movable rod protrudes outside of the casing makes such an arrangement cumbersome and complicated.

In view of the above, it is an object of the present invention to alleviate and mitigate the above disadvantages and, in addition, to provide a reduction in part count, product mass and total envelope volume.

SUMMARY OF THE INVENTION

Accordingly, the present invention provides a contactor comprising:

- a first contact member, wherein the first contact member is fixed and connected to a first conductor of an electrical circuit;
- a second contact member, wherein the second contact member is connected to a second conductor of the electrical circuit by a connector and wherein the second contact member moves between a break position, in which the first and second contact members are out of contact, and a make position, in which the first and second contact members are in contact;
- an actuator assembly, wherein the actuator assembly is coupled to the second contact member such that actuation of the actuator assembly translates into movement of the second contact member;
- an electromagnetic arrangement comprising an electromagnetic coil and at least a part of the actuator assembly, wherein, when the coil is energised, the coil generates a magnetic field and thereby the actuation assembly is caused to move under the influence of the magnetic field, which in turn causes the second contact member to move; and,
- an enclosure, wherein the enclosure is hermetically sealable, wherein the first and second contact members, the connector, and the actuation assembly are inside the enclosure.

In one arrangement, the coil is arranged outside the enclosure.

In one arrangement, the actuator assembly is actuated by the electromagnetic coil contactlessly, i.e. without the need for a mechanical linkage between the electromagnetic coil and the actuator assembly. In this arrangement, when the coil is energised, the coil generates a magnetic field and the actuation assembly is caused to move solely under the influence of the magnetic field.

Preferably, the connector is a deformable conductor. Preferably, the connector is arranged to deform upon movement of the second contact member within the enclosure. The connector may be a flexible connector, including, but not limited to a bundle, braid, wire, cable or spring. The connector may also be formed by conducting lamination. The connector is preferably reversibly deformable. The connector may be resiliently deformable, such as e.g. a spring.

Preferably, the second contact member is a single point contactor.

Preferably, the enclosure defines a single chamber and wherein the first and second contact members, the connector, and the actuation assembly are enclosed within the single chamber. In one embodiment, the first and second contact members, the connector, and the actuation assembly are completely confined within the single chamber, so that no part of the first and second contact members, the connector, and the actuation assembly protrudes outside the enclosure.

Preferably, the enclosure has first and second opposite ends, wherein the first conductor and the first contact member are located at the first end of the enclosure and the second conductor and at least a portion of the connector are located at the second end of the enclosure. Preferably, the second contact member is movable along a longitudinal axis of the enclosure extending between the first end and the second end.

Preferably, the second contact member has a first end proximal to the first contact member and a second end distal of the first contact member and wherein the connector is attached to the second contact member at a location spaced from the first end of the second contact member.

The contactor may comprise an auxiliary contact mechanism having a signal circuit, wherein the auxiliary contact mechanism is configured to be actuated by the actuator assembly and upon said actuation to activate an external signal indicating the circuit status.

In one arrangement, the auxiliary contact mechanism comprises

- an auxiliary contact member located within the enclosure and connected to the actuator assembly so as to be movable upon movement of the actuator assembly; and
- an auxiliary electrode;
- wherein movement of the actuator assembly causes the auxiliary contact member to move between a disengaged position, in which the auxiliary contact member and the auxiliary electrode are out of contact and no electric current is generated in the signal circuit and an engaged position, in which the auxiliary contact member and the auxiliary electrode are in contact and an electric current is generated in the signal circuit, wherein the auxiliary contact mechanism has a signal generating component configured to activate an external signal indicating the circuit status based on the presence or the absence of an electric current in the signal circuit.

Preferably, the actuator assembly comprises a piston movable within the enclosure and having a magnetic element, wherein the piston is coupled to the second contact member; and wherein the magnetic element is in electromagnetic communication with the coil. The piston is preferably movable within the enclosure along a longitudinal axis of the enclosure.

Preferably, the first contact member is configured to provide a heat sink capable to dissipate heat generated when the first and second contact members are in contact. In one arrangement, the heat sink may be provided by a conductive extension of the first contact member. The conductive extension may extend within the enclosure in the direction away from the first contact and the second contact. The conductive extension may line at least a portion of the enclosure. The conductive extension may be of a complementary shape to at least a portion of an internal wall of the enclosure. The conductive extension may form an additional inner casing within the enclosure for the first and second contact members, the connector and the actuator assembly. Such an integration of casing and the first contact member provides for an improved heat dissipation, unlike the prior art, which provides an isolated casing and contact layout. The heat sink may also be provided by the first contact member being made substantially larger than the second contact member so as to conduct heat away from the second contact member when the first and second contact members are in contact. The heat sink provides for a more efficient thermal dissipation of thermal loads away from the first and second contact members.

Preferably, the enclosure is directly coupled to the first conductor.

Preferably a defined and controlled environment is provided within the enclosure. The enclosure may be under vacuum or filled with at least one gas, for example, but not limited thereto, an inert gas, or a mixture of gases.

The enclosure is preferably formed from a thermally and electrically conductive material, such as, for example, but not limited thereto, metal.

In one arrangement, the enclosure is tubular, but the invention is not limited to a particular shape of the enclosure. The enclosure is sealed, preferably hermetically sealed.

The invention requires only a single moving contact member to make and break the circuit. Because of the contact point between the first and second contact members lies on the line of movement of the second contact member, the contacts do not wear as much as in the prior art arrangement with a cross bar. As a result, arc formation is reduced. As the number of working contact faces is reduced from four to two, there is also a reduction in part count, and a reduction in contact member material and mass. Furthermore, due to the provision of the deformable conductor, the enclosure, specifically, sealing interfaces thereof, are not subjected to the loads or stresses which would otherwise be transmitted to them during the actuation process in the absence of the deformable conductor. The deformable conductor prevents the loads and stresses from being transmitted to the enclosure. As a result, the risk that seals of the enclosure will be compromised is removed or reduced. The arrangement of the present invention also helps to reduce noise due to vibration during operation of the contactor and to improve stability compared to traditional arrangements with a cross bar.

The provision of a single chamber for both actuation and connection results in a contactor having fewer parts and lesser weight than prior art arrangements with separate actuation and connection chambers. The reduction in part count promotes compact contactor design and reduces the amount of material needed to manufacture the contactor of the invention.

The contactor of the invention is suitable for use in electrical vehicles or battery storage solutions, but the invention is not in any way limited to such use.

Overall the present invention provides for the reduction in cost, weight, volume and energy through inline contact, reduced part count, compact layout and improved thermal dissipation. The simpler and more robust design of the present invention reduces failure points in the circuit and increases reliability.

The term "conductor" used herein should be understood, unless specified otherwise, to mean an electrical conductor.

DETAILED DESCRIPTION OF THE INVENTION

Figure 1:
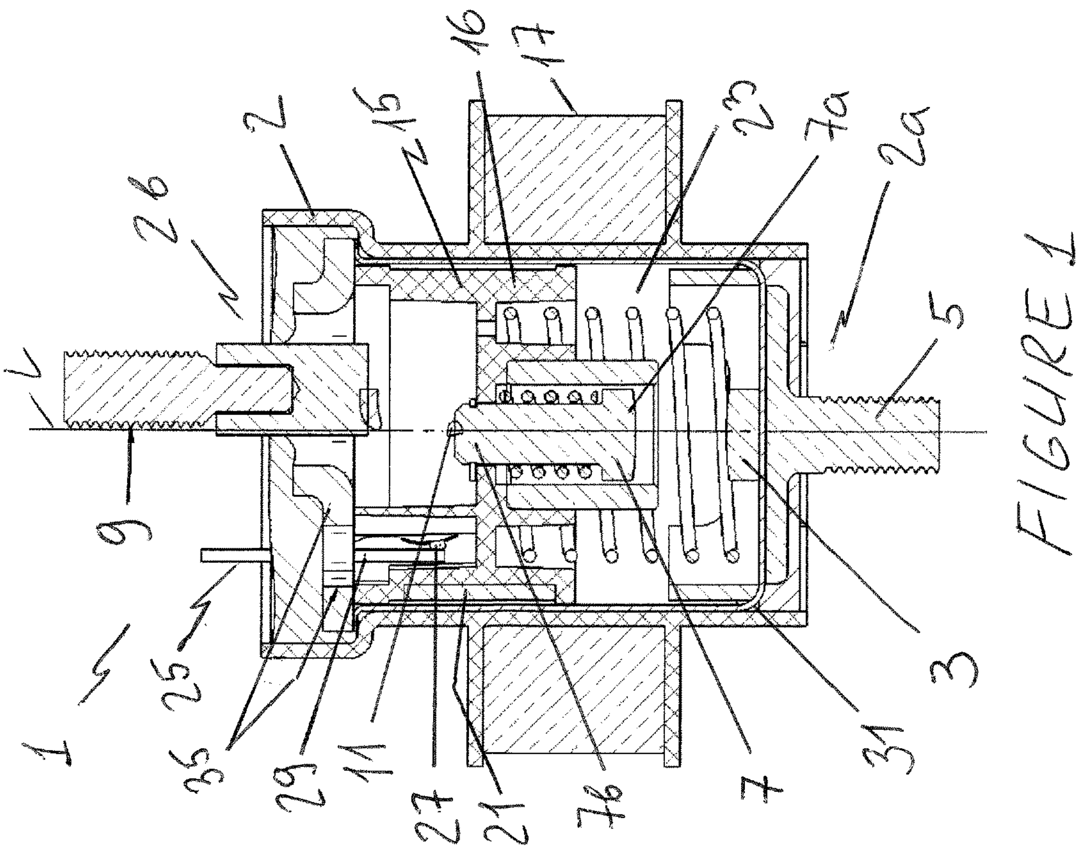

The invention will now be described with reference to the accompanying drawings, which show, by way of example only, an embodiment of the invention. In the drawings:

FIGS. 1 and 2 are schematic cross-sectional views of the contactor of the invention in perpendicular planes.

Referring to FIGS. 1 and 2, the present invention provides a contactor 1 having a hermetically sealable tubular enclosure 2, which has first and second opposite ends 2*a*, 2*b*.

The enclosure 2 has a defined and controlled environment provided inside it. Depending on particular requirements, the enclosure 2 may be under vacuum or filled with at least one gas, for example, but not limited thereto, an inert gas, or a mixture of gases. The enclosure 2 is formed from a thermally and electrically conductive material, such as metal. The contactor 1 has a first contact member 3. The first contact member 3 is fixed and connected to a first conductor 5 of an electrical circuit. The first conductor 5 and the first contact member 3 are located at the first end 2*a* of the enclosure 2. The contactor 1 also has a second contact member 7 connected to a second conductor 9 of the electrical circuit by a connector 11. The second conductor 9 and at least a portion of the connector 11 are located at the second end 2*b* of the enclosure 2. The second contact member 7 has a first end 7*a* proximal to the first contact member 3 and a second end 7*b* distal of the first contact member 3 and the connector 11 is attached to the second contact member 7 at a location spaced from the first end 7*a* of the second contact member 7.

The second contact member 7 is movable between a break position (as shown in FIGS. 1 and 2), in which the first and second contact members 3, 7 are out of contact, and a make position (not shown), in which the first and second contact members 3, 7 are in contact. The contact between the first and second contact members 3, 7 is preferably a single point contact.

The contactor 1 also has an actuator assembly 15. The actuator assembly 15 is coupled to the second contact member 7 such that actuation of the actuator assembly 15 translates into movement of the second contact member 7 as will be described in more detail below. The actuator assembly 15 comprises a piston 16 coupled to the second contact member 3 and movable within the enclosure 2 along a longitudinal axis L of the enclosure 2.

The contactor 1 includes an electromagnetic arrangement comprising an electromagnetic coil 17 arranged outside the enclosure 2 and a magnetic element 21 mounted on the piston 16 and being in electromagnetic communication with the coil 17. When the coil 17 is energised, the coil 17 generates a magnetic field and thereby the piston 16 is caused to move under the influence of the magnetic field, which in turn causes the second contact member 7 to move between the make and the break positions. A spring 18 normally keeps the piston 16 away from the first contact member 3 so that the second contact member 7 is in the break position. When the coil 17 is energised and causes the piston 16 to move into the make position, the piston 16 overcomes and deforms the spring 18. The piston 16 moves the second contact member 7 into the make position and the second contact member 7 remains in the make position for as long as the coil 17 is remains energised. A magnetic latch sleeve 20 is provided to help the second contact member 7 to remain in the make position and to reduce the energy consumed by the coil 17. To break the circuit, the coil 17 is de-energised thereby releasing the spring 18, which moves the piston 16 away from the first contact member 3 and thus brings the second contact member 7 into the break position. An overtravel spring 22 around the second contact member 7 provides for a controlled compression of the first and second contact members 3, 7. A ceramic barrier 24 is provided around the second contact member 7. In the presently described embodiment, the actuator assembly 15 is actuated by the electromagnetic coil 17 contactlessly, i.e. without the need for a mechanical linkage between the electromagnetic coil 17 and the actuator assembly 15. When the coil 17 is energised, the coil 17 generates a magnetic field and the actuation assembly 15 is caused to move solely under the influence of the magnetic field.

In the presently described embodiment, the enclosure 2 defines a single chamber 23 and the first and second contact members 3, 7, the connector 11, and the actuation assembly 15 are completely confined within the chamber 23 so that no part of the first and second contact members 3, 7, the connector 11, and the actuation assembly 15 protrudes outside the enclosure 2 during the use of the contactor 1.

The connector 11 is provided in the presently described embodiment as a reversibly deformable conductor, which deforms upon movement of the second contact member 7 within the enclosure 2. The connector 11 may be a flexible connector, including, but not limited to a bundle, braid, wire, cable or spring. The connector may also be formed by conducting lamination.

The contactor 1 comprises an auxiliary contact mechanism 25 having a signal circuit (not shown). The auxiliary contact mechanism 25 is configured to be actuated by the actuator assembly 15 and upon said actuation to activate an external signal indicating the status of the electrical circuit of the contactor 1. The auxiliary contact mechanism 25 comprises an auxiliary contact member 27 located within the enclosure 2 and connected to the actuator assembly 15 so as to be movable upon movement of the actuator assembly 15; and an auxiliary electrode 29. Movement of the actuator assembly 15 within the enclosure 2 causes the auxiliary contact member 27 to move between a disengaged position (not shown), in which the auxiliary contact member 27 and the auxiliary electrode 29 are out of contact and no electric current is generated in the signal circuit and an engaged position (as shown in FIGS. 1 and 2), in which the auxiliary contact member 27 and the auxiliary electrode are 29 in contact and an electric current is generated in the signal circuit. The auxiliary contact mechanism has a signal generating component (not shown) configured to activate an external signal indicating the status of the electrical circuit of the contactor 1 based on the presence or the absence of an electric current in the signal circuit. A number of options of generating such a signal would be readily apparent to a person skilled in the art.

The first contact member 3 provides a heat sink capable to dissipate heat generated when the first and second contact members 3, 7 are in contact. In the presently described embodiment, the heat sink is provided by a conductive extension 31 of the first contact member 3. The conductive extension 31 extends within the enclosure 2 in the direction away from the first contact member 3 and the second contact member 7. The conductive extension 31 lines the enclosure 2 and has a shape complementary to at least a portion of an internal wall of the enclosure 2. The conductive extension 31 forms an additional inner casing within the enclosure 2 for the first and second contact members 3, 7, the connector 11 and the actuator assembly 15. Although not shown in the drawings, the heat sink may also be provided by the first contact member 3 being made substantially larger than the second contact member 7 so as to conduct heat away from the second contact member 7 when the first and second contact members 3, 7 are in contact. Larger first contact member 3 also facilitates alignment of the first and second contact members 3, 7 within the contactor 1.

In the presently described embodiment, electrical insulation and hermetic sealing are provided between the electrical components in the contactor 1 using glass to metal seals 35 with the conductors 9, 25. However, other suitable solutions for providing electrical insulation and hermetic sealing are envisaged and will be apparent to a person skilled in the art.

An external arc blow out magnet 37 may be provided around a region of the enclosure 2 where contact between the first and second contact members 3, 7 occurs.

It will be appreciated by those skilled in the art that variations and modifications can be made without departing from the scope of the invention as defined in the appended claims.

The invention claimed is:

1. A contactor comprising:

a first contact member, wherein the first contact member is fixed and connected to a first conductor of an electrical circuit;

a second contact member, wherein the second contact member is connected to a second conductor of the electrical circuit by a connector and wherein the second contact member moves between a break position, in which the first and second contact members are out of contact, and a make position, in which the first and second contact members are in contact;

an actuator assembly, wherein the actuator assembly is coupled to the second contact member such that actuation of the actuator assembly translates into movement of the second contact member;

an electromagnetic arrangement comprising an electromagnetic coil and at least a part of the actuator assembly, wherein, when the coil is energized, the coil generates a magnetic field and thereby the actuation assembly is caused to move under the influence of the magnetic field, which in turn causes the second contact member to move;

an enclosure, wherein the enclosure is hermetically sealable, wherein the first and second contact members, the connector, and the actuation assembly are inside the enclosure; and wherein the coil is outside the enclosure; and wherein the actuator assembly comprises a piston movable within the enclosure and having a magnetic element that is in electromagnetic communication with the coil and spaced from the second contact member by the piston coupled to the second contact member.

2. A contactor according to claim 1, wherein the actuator assembly is actuated by the electromagnetic coil contactlessly.

3. A contactor according to claim 1, wherein the connector is a deformable conductor.

4. A contactor according to claim 3, wherein the connector is arranged to deform upon movement of the second contact member within the enclosure.

5. A contactor according to claim 3, wherein the connector is flexible; optionally, wherein the connector is any one of a flexible bundle, a flexible braid or a spring.

6. A contactor according to claim 3, wherein the connector is formed by conducting lamination; and/or wherein the connector is reversibly deformable.

7. A contactor according to claim 1, wherein the second contact member is a single point contactor.

8. A contactor according to claim 1, wherein the enclosure defines a single chamber and wherein the first and second contact members, the connector, and the actuation assembly are enclosed within the single chamber; optionally, wherein the first and second contact members, the connector, and the actuation assembly are completely confined within the single chamber.

9. A contactor according to claim 1, wherein the enclosure has first and second opposite ends, wherein the first conductor and the first contact member are located at the first end of the enclosure and the second conductor and at least a portion of the connector are located at the second end of the enclosure; optionally, wherein the second contact member is movable along a longitudinal axis of the enclosure extending between the first end and the second end.

10. A contactor according to claim 1, wherein the second contact member has a first end proximal to the first contact member and a second end distal of the first contact member and wherein the connector is attached to the second contact member at a location spaced from the first end of the second contact member.

11. A contactor according to claim 1, wherein the contactor comprises an auxiliary contact mechanism having a signal circuit, wherein the auxiliary contact mechanism is configured to be actuated by the actuator assembly and upon said actuation to activate an external signal indicating the circuit status; optionally, wherein the auxiliary contact mechanism comprises an auxiliary contact member located within the enclosure and connected to the actuator assembly so as to be movable upon movement of the actuator assembly; and an auxiliary electrode;

wherein movement of the actuator assembly causes the auxiliary contact member to move between a disengaged position, in which the auxiliary contact member and the auxiliary electrode are out of contact and no electric current is generated in the signal circuit and an engaged position, in which the auxiliary contact member and the auxiliary electrode are in contact and an electric current is generated in the signal circuit, wherein the auxiliary contact mechanism has a signal generating component configured to activate an external signal indicating the circuit status based on the presence or the absence of an electric current in the signal circuit.

12. A contactor according to claim 1, wherein the piston is movable within the enclosure along a longitudinal axis of the enclosure.

13. A contactor according to claim 1, wherein the first contact member is configured to provide a heat sink capable to dissipate heat generated when the first and second contact members are in contact; wherein the heat sink is provided by the first contact member being made larger than the second contact member so as to conduct heat away from the second contact member when the first and second contact members are in contact.

14. A contactor according to claim 1, wherein a heat sink is provided by a conductive extension of the first contact member, the conductive extension extending within the enclosure in the direction away from the first contact member and the second contact member.

15. A contactor according to claim 10, wherein a conductive extension lines at least a portion of the enclosure; optionally, wherein the conductive extension is of a complementary shape to at least a portion of an internal wall of the enclosure.

16. A contactor according to claim 1, wherein the enclosure is directly coupled to the first conductor.

17. A contactor according to claim 1, wherein a defined and controlled environment is provided within the enclosure.

18. A contactor according to claim 12, wherein the enclosure is under vacuum or filled with at least one gas.

19. A contactor according to claim 1, wherein the enclosure is formed from a thermally and electrically conductive material.

20. A contactor according to claim 1, wherein the enclosure is tubular.

* * * * *